United States Patent [19]
Bishop et al.

[11] Patent Number: 5,563,931
[45] Date of Patent: Oct. 8, 1996

[54] EMERGENCY WIRELESS TELEPHONE AND CONTROL SYSTEM, AND METHOD

[75] Inventors: Ronald D. Bishop, Mission Viejo; Vane P. Clayton, Long Beach; Michael H. Kreutzer, Santa Ana, all of Calif.; Elliott H. Drucker, Kirkland, Wash.

[73] Assignee: SOS Wireless Communications & National Dispatch Center, Irvine, Calif.

[21] Appl. No.: 291,172

[22] Filed: Aug. 16, 1994

[51] Int. Cl.$^6$ .............................. H04Q 7/22; H04Q 7/08; H04M 11/04

[52] U.S. Cl. .................................. 379/59; 379/57; 379/37; 455/33.1

[58] Field of Search .................................. 379/58, 59, 57, 379/61, 369, 370, 433, 38, 39, 37, 66; 455/89, 90, 33.1; 340/825.44

[56] References Cited

U.S. PATENT DOCUMENTS

| | | |
|---|---|---|
| 4,658,096 | 4/1987 | West, Jr. . |
| 5,203,009 | 4/1993 | Bogusz et al. .......................... 455/33.1 |
| 5,365,570 | 11/1994 | Boubelik ..................................... 379/59 |
| 5,388,147 | 2/1995 | Grimes ....................................... 379/58 |
| 5,388,148 | 2/1995 | Seiderman .................................. 379/59 |

*Primary Examiner*—Curtis Kuntz
*Assistant Examiner*—Michael B. Chernoff
*Attorney, Agent, or Firm*—Curtis L. Harrington

[57] ABSTRACT

The emergency wireless telephone and system describes improved control and service offered in the conventional public telephone system as pertains to cellular telephone service. The system contemplates an emergency wireless telephone, with options, including: (1) a method and system of alerting the user of a mobile emergency phone without the need for keeping the telephone's electronics under power, (2) a system which enables the control and responsibility for a call to be moved further downstream at a cellular telephone switch, by altering the character and use of the mobile identification number and by reprogramming the telephone switch, (3) establishing a hierarchy for and insuring that the identification of the calling party is transmitted, both before and after answer supervision is transferred, (4) an fraud protection, interactive identification system using a key and mathematical operator which both verifies the user's identity and eliminates the need for the look-up of the caller's telephone or account number, (5) an interactive in phone switch which can interactively select between the "A" side and "B" side carriers in a given locale, (6) a system which can implement a manual call back method of handling incoming calls, and (7) a system which enables automatic "meet me" handling of incoming calls.

43 Claims, 7 Drawing Sheets

| 8 | 7 | 6 | 5 | 4 | 3 | 2 | 1 |
|---|---|---|---|---|---|---|---|
| 1 | O/E | NATURE OF ADDRESS INDICATOR ||||||
| 2 | SPARE | NUMBERING PLAN || RESERVED ||||
| 3 | 2nd ADDRESS SIGNAL |||| 1ST ADDRESS SIGNAL ||||
| ⋮ | ⋮ |||||||
| n | FILLER (IF NECESSARY) |||| nth ADDRESS SIGNAL ||||

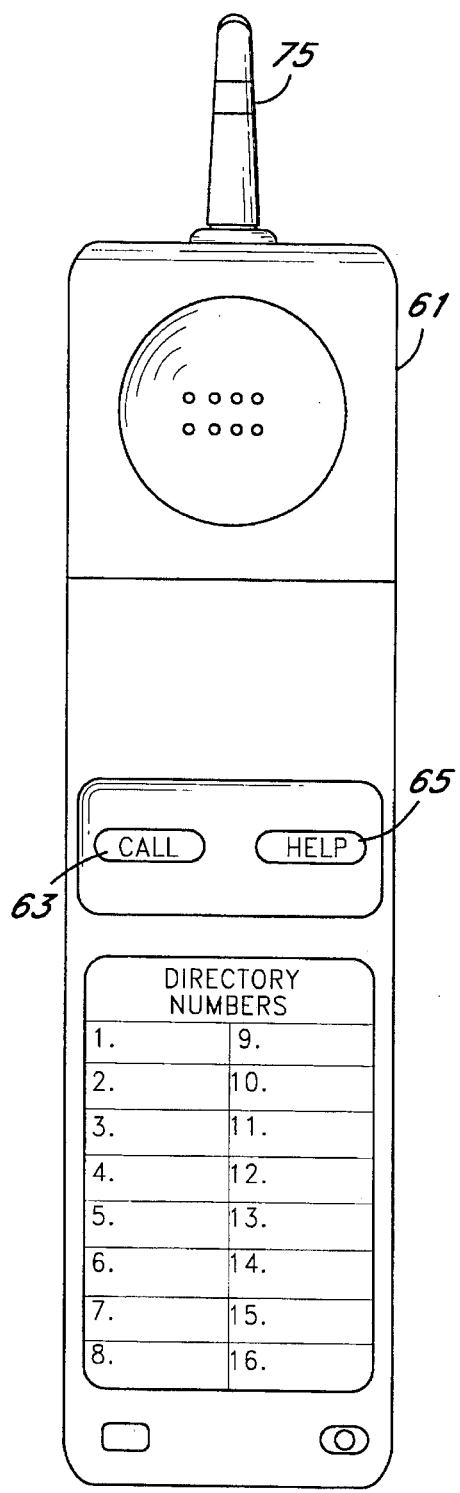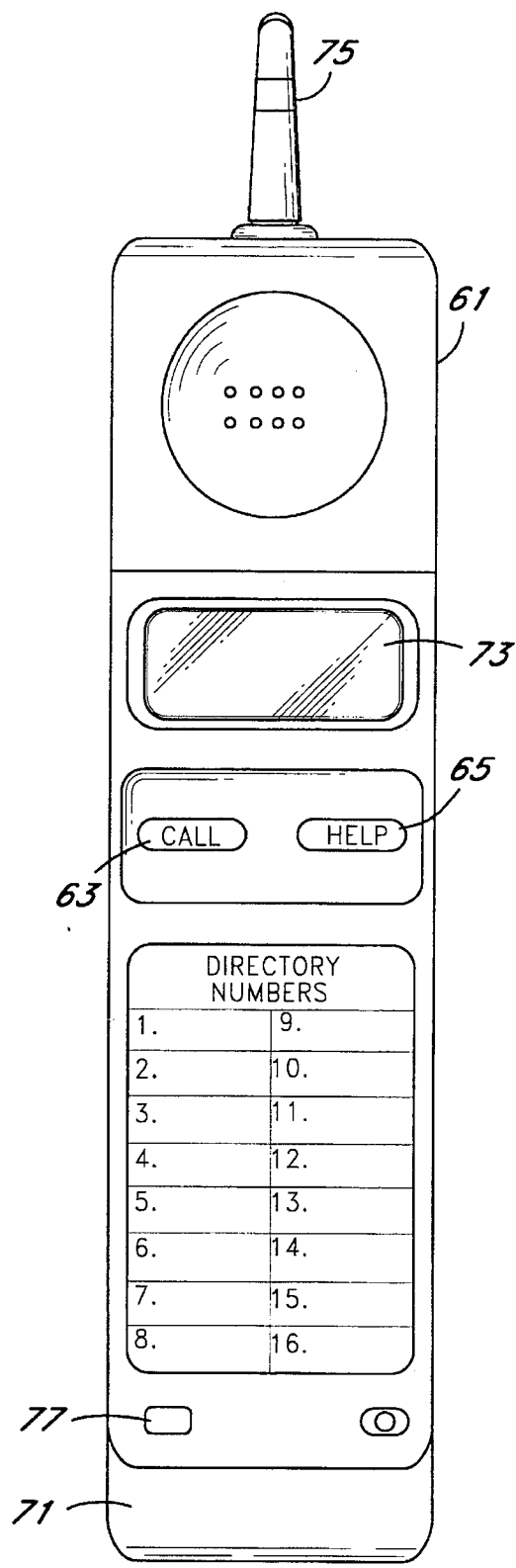

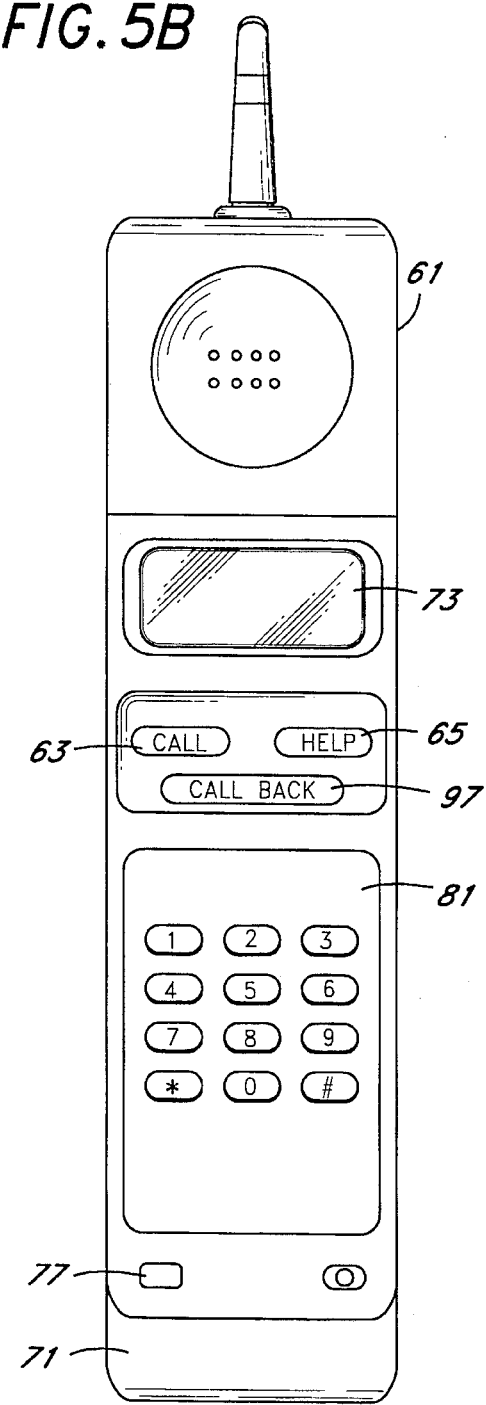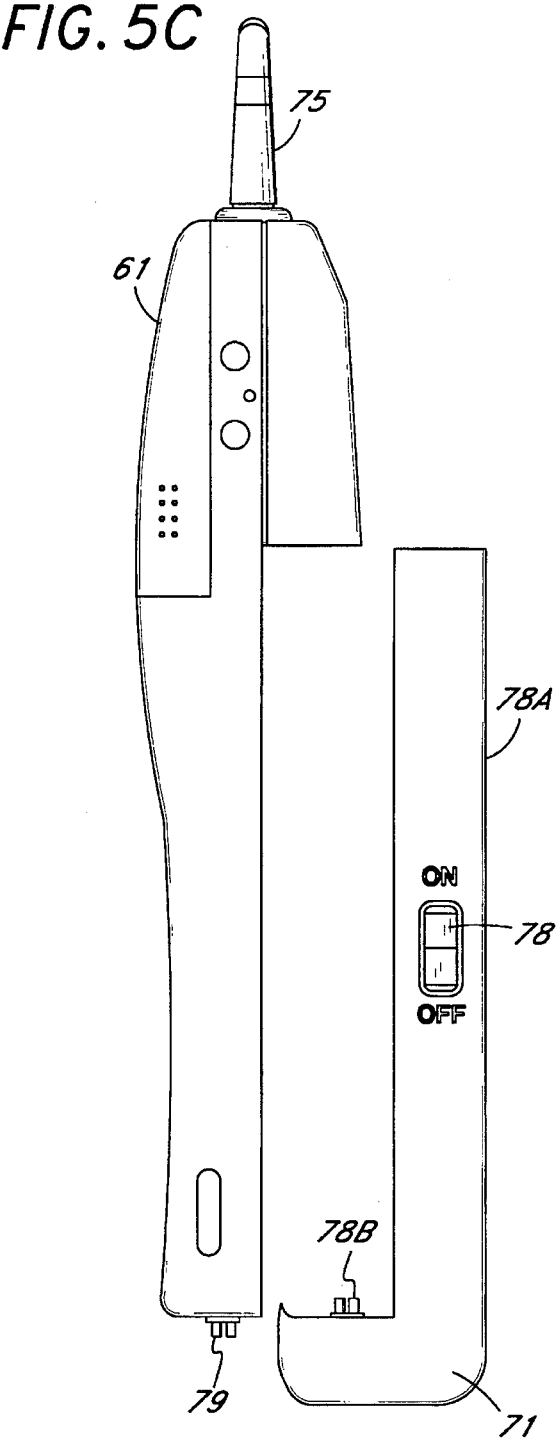

FIG. 6
FIG. 7
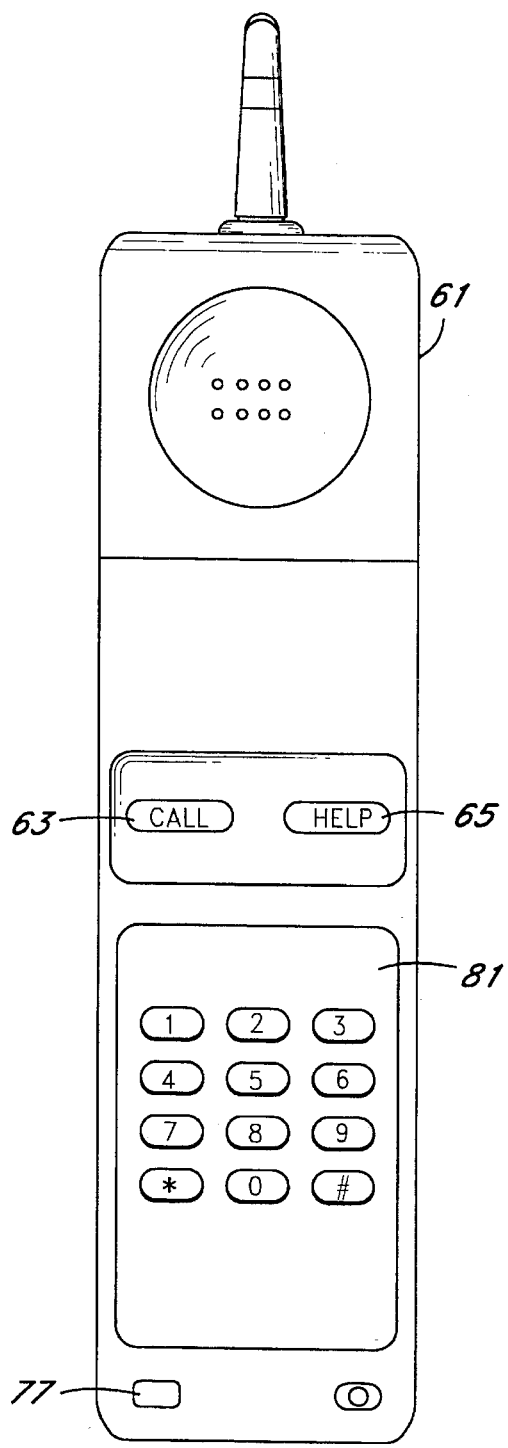
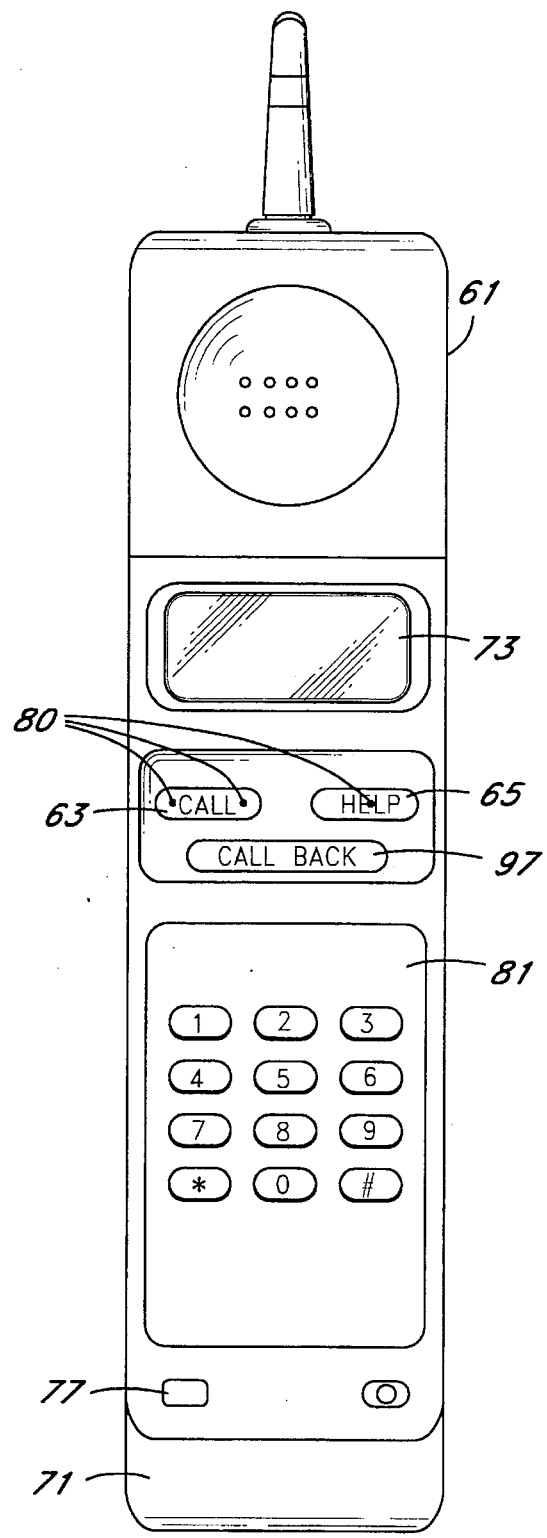

EMERGENCY WIRELESS TELEPHONE AND CONTROL SYSTEM, AND METHOD

FIELD OF THE INVENTION

The present invention relates to the field of electronic communication systems devices and methods. More specifically, the present invention relates to a system which facilitates the introduction of an emergency wireless telephone, eliminating many of the disadvantages of standard wireless phones and their associated large capacity demands on a system. Even more specifically, the invention relates to (1) a method and system of alerting the user of a mobile emergency phone without the need for keeping the telephone's electronics under power, (2) a system which enables the control and responsibility for a call to be moved further downstream at a cellular mobile telephone switch, by altering the character and use of the mobile identification number and by re-programming the cellular mobile telephone switch, (3) establishing a hierarchy for and insuring that the identification of the calling party is transmitted, both before and after answer supervision is transferred, (4) an fraud protection, interactive identification system using a key and mathematical operator which both verifies the user's identity and eliminates the need for the look-up of the caller's telephone or account number, (5) an interactive in phone switch which can interactively select between the "A" side and "B" side carriers in a given locale, (6) a system which can implement a manual call back method of handling incoming calls, and (7) a system which enables automatic "meet me" handling of incoming calls.

BACKGROUND OF THE INVENTION

Cellular telephones are becoming more commonplace, more inexpensive, and more standardized with each passing day. The system with which cellular phones operate must accommodate both the forward calling from the cellular telephone to another phone of any type, and the reverse calling of the cellular telephone from another phone of any type.

The origins of modern cellular communication dates back to the 1920's with experimental equipment being first installed in police vehicles in some large cities. Commercial applications of mobile radio were not significant until after World War II. The needs of the military greatly accelerated development of radio technology, and these early advances appeared in commercial products available in the early 1950's.

The early systems began with simplex operation, and progressed to duplex mobile telephone frequency pairs in the 150 MHz and 450 MHz bands. In the mid 1960's, Bell Laboratories began working on the details of a system which evolved into the cellular system of today. Today's cellular system can accommodate some variance with respect to the equipment and manner of accessing the system. For Example, U.S. Pat. No. 4,658,096 to West, Jr. et al, and entitled "System for Interfacing a Standard Telephone Set with a Radio Transceiver" illustrates one such method for interfacing. U.S. Pat. No. 4,788,711 to Michael Nasco, Jr. et al, and entitled "Apparatus and Method for a Cellular Freeway emergency Telephone Service" illustrates a method of using roadside cellular phones which is currently in use on the nation's highways. Both of these patent applications are incorporated by reference herein.

Parameters which had to be settled on included spectrum allocation, digital signalling and control, the geographical subdivisions from which radio control is accomplished, commonly known as cell sites, and the allocation and use of frequency control channels for message carrying capability. The original cellular spectrum allocation was for a total of 40 MHz, with 20 MHz providing service in each direction between the base station and the mobile station. A total of 666 channels, each 30 KHz wide, were designated for each direction. The channels were divided equally into two competing bands. These bands were the A band, also known as the "non-wireline" band, and the B band, also known as the "wireline" band. The original intent was that in each market, the local exchange carrier (which was publicly regulated) would be granted a license for the B band, while the A band would be granted to a private business on the basis of competitive application.

As time progressed, and with the break-up of the smaller telephone carriers, the A band and the B band have developed into competing systems. Each may have its own commercial carrier associated with a city served by a cellular system. Further, the service level and rate structure offered by the A band and B band carriers will typically be quite different. Current cellular phone systems do not allow for the automatic selection of, or change in the selection of a particular carrier band.

If such a selective change were possible, flexibility of operation would occur. Whole groups of users of a certain type could switch between the two types of cellular carriers, and thus the carriers would begin to behave more competitively. Unfortunately, the lack of the ability to easily switch back and forth is a major shortcoming of conventional cellular technology.

As will be shown, conventional cellular use involves not only a complex and secure communications scheme, but also a scheme of similar complexity to identify users of the system and apply charges for use of the system properly. When a user makes a call through the cellular system, the user's equipment identifies them by a mobile identification number, MIN. Although this number is not required to be a standard telephone number as defined by the North American Dialing Plan, it usually is such a standard number.

The North American Dialing Plan, also known as the North American Numbering Plan is a method of identifying telephone trunks in the public network of North America, called World Numbering Zone 1 by the CCITT. The plan has three ways of identifying phone numbers in North America, a three digit area code, a three digit exchange or central office code and a four digit subscriber code. Other countries have more complex numbering schemes.

One designation for area code is the designation NPA, while a corresponding designation for the seven digit local phone number is NXX. The combination is sometimes known as NPP/NXX. The number of NPA codes is nearing depletion. Bellcore, the Bell Communications Research group, was formed at divestitute to provide certain centralized se4rvices to the seven regional Bell Holding companies. It serves as a focal point for telephone communications matters of the federal government. This group was instrumental in the formation of the NPP/NXX plan. Thus the typical mobile identification number is typically complete with area code and accompanying seven digits, similar to a dedicated wired telephone number.

The number alone is not much use without some reference to compare it to. A subscriber data base, either local or long distance, must be addressed to verify the legitimacy of the user. In this manner, lost or stolen mobile or portable phones can be rendered unusable by removing the user's identification number or access go-ahead from the home service cellular switch data base. By home service, is meant the area in which the cellular phone was based, usually related to an address where the bills are paid and especially related to the area code and trunk, NPP/NXX assigned to the conventional cellular phone.

Where the user of the portable or mobile phone is "roaming," or out of his usual home geographic area, there are what will be referred to as service cellular system cell sites and switch matrix where the user is located will probably not have the subscriber data base locally available, and will have to place a verifying inquiry to the roamer's home system, to access his local subscriber data base to determine his legitimacy.

The communication of this information over long distances is usually accomplished by two methods. One method is signaling system seven, while the other is known as in-channel ANI spill. Both of these mechanisms use a modem type method of transferring information.

Signaling system seven is a standard for general purpose common channel signaling, and is defined by an American National Standard for telecommunications promulgated by the American National Standards Institute, Inc. It is optimized for operation in digital telecommunications networks, and for operation over 56 or 64 kbit/s digital channels. This system is similar to packet operation, and has layers including physical, data link, network, transport, session, presentation, and application. The signaling is assumed to be below the network layer.

The signal messages have defined parts which include the routing label, circuit identification code, message type code, mandatory fixed part, mandatory available part and the optional part which may contain fixed length and variable length parameter fields.

For Example, the call reference and called party reference fields are given in Figure X. With regard to the call reference identification format, a series of octets labeled 1, 2, 3, . . . n are vertically given along side the reference field box. Horizontally, the numerals given are the eight bits which define the bit position for each octet. The first octet identifies the type of address indicator, the second the numbering plan, and the third through the nth octets identify the numerals which further identify either the called or calling party.

Signaling system seven can perform the functions of supervising the status of a line or circuit, alerting the arrival of an incoming call, addressing and routing the signals over a network.

In-channel ANI spill is a method which stands for automatic number identification. This method may include a series of digits at the front of the phone call which inform you of the identification of the phone number calling. They may arrive as digital or analog, and may be touchtone dual tone multiple frequency (DTMF) digits generated by the phone call process or in a digital form on the same circuit or on a different circuit. Thus, in-channel ANI spill is truly an amorphus designation covering a wide range of multiple methods of routing automatic number identification. ANI is associated with caller ID, and is not made available by all cellular service providers, or maybe provided with some restrictions. These restrictions can similarly limit its usefulness with respect to the more preferred signaling system seven.

Both of these methods are used to transmit information across the telephone system, including caller ID, the system which makes the caller's identification known at the called party's telephone. In the standards, there are about 100 different types of commands which can be acted upon by these systems, including inquiries and system modifications.

Further, the use of the mobile or portable telephone's specific identification number which includes both an electronic serial number (ESN) as well as the mobile identification number (MIN), will coincide with its accessibility when being called. Since a land-based or other user of the telephone system will access the mobile or portable user based upon a conventional telephone number, according to the Bellcore promulgated North American Dailing Plan, the use of a standard format telephone number as the mobile or portable telephone's identity number is efficient.

However, with the proliferation of other types of equipment and the need for multiple lines and their associated telephone numbers, today's NPA/NXX numbers are becoming an exhausted resource at a higher than ever rate. By sheer force of numbers, the numbers within each area code, and therefore the number of three digit area codes are a finite resource. The extremely infrequent use of a mobile phone still requires the assignment, and therefore the loss of, a standard NPA/NXX telephone number. Infrequent users may be persons who would only use the phone once or so per month, and individuals who keep a mobile phone for emergency use.

Unfortunately, and according to the system described above, the verification of the caller's legitimacy occurs only at one point, the home cellular system subscriber data base. The system of data-base verification operates using standard telephone numbers within its area code. Once the subscriber data base has been successfully encountered, the user has access to the system. Consequently, under current operations, a user must have an identification which is configured as a standard telephone number conforming to the North American Dialing Plan, and is not required to further identify or legitimize his identity with respect to the system.

Further, the use of the subscriber data base is subject to the procedures and requirements of the cellular telephone company. The cellular telephone company's system of allowing access, denying access, listing lost or stolen phones, improper fraud-type users, etc will always be a restrictive element. In most cases, information cannot be reported or entered at night, after most customer service centers are closed, and significant delays can occur between time of reporting and changes to the system. Further, because the cellular telephone system is monolithic with respect to its relationship with the public, the subscriber data base is configured to either allow or deny access rather than to selectively deliver differing services. In short, more specialized and selective services cannot be offered at the present time, so long as dependency is had upon conventional cellular and land line telephone system access methods.

Current access methods therefore do not allow differential access to the system, much less a higher degree of security. When a customer accesses the system to make a call, there is no guarantee that the customer, or his equipment is truly identified. Since the mobile identification number has a format matching regular North American Dialing Plan telephone numbers, it is relatively easy for persons with fraudulent intent to obtain the mobile telephone number and match the electronic serial number of another user, program this number into another type of cellular telephone equipment, access the cellular telephone system, have that equipment identified as legitimate and begin to accrue charges to the appropriated mobile telephone number account.

What is therefore needed is a non-standard, publicly non-available, non-conforming (with respect to the North American Dialing Plan) number for mobile and portable equipment, and perhaps coupled with an interactive modem-type transmission of information which positively identifies the equipment and user as legitimate.

Another disadvantage of keeping a conventional mobile phone for infrequent use is the power drain. For mobile phones, the electronics are typically powered during the times that the ignition switch is on. There is normally sufficient power to keep the associated electronics powered, although an infrequent user will expend an amount of power far more often than the telephone is used and much more often than is necessary for expected calls.

With regard to portable units, there is a current drain of the battery resource based upon being in the receive mode. In some phones, the batteries have to be recharged daily, weekly or changed monthly. Although such a frequency of recharging or replacement does not seem burdensome, it must be compared with respect to the frequency of use. For uses which are limited to emergency uses, the user will very likely forget about charging the batteries completely. If a low battery state occurs before and during an emergency, or before and during an important need, the benefits of having a portable cellular telephone will be eliminated. Further, to have relied upon the cellular telephone service may actually place the user in a worse position than would otherwise be the case if the portable telephone were not present.

Further, since conventional cellular useage is a mixture of monitoring for a call and transmitting and receiving a signal, the battery useage is difficult to predict. Even were it easy to predict, no provision has been made for insuring that the batteries are always fully charged.

Another problem with conventional cellular telephones is the accessibility of the controls, and especially on an expedited basis, such as during an emergency. In some cases the controls are lighted, but usually the controls will still require high attention and concentration in order to complete the dialing process. This is true also for 911 service and operator service. A separate button is usually activated for the send function, in addition to the keys required for entering the destination call numeric address, or telephone number.

Conventional cellular phones can pose a particular problem for sight impaired people. The sheer volume of the control buttons makes it easy for dialers to make mistakes. Further, in the event of an emergency, an excited person could have problems quickly dialing out, much less a sight impaired person. Even where the sight impaired may dial the operator to ask for dialing assistance, the operator will typically initially instruct the caller to dial the number causing the dialer to have to continually verbalize his or her handicap. This can be quite frustrating.

Further complicating the procedure is the necessity to remember and dial the telephone numbers to obtain the required help in relation to the emergency situation. Further, there is no ability for a user to tailor the usage of his phone to the types of emergency or types of uses he or she might or will usually encounter.

For example, if an infrequent user wanted to limit the use of his portable phone to 911 and calls to his home, he could not do so with a conventional mobile phone. An unauthorized user, and especially where the unauthorized use were to occur for a short time, could run up a large bill. For example, where a worker leaves his portable phone at work, or in his car, an unauthorized user could simply pick up and use the portable phone and return it to its place. Where no actual material theft of the cellular telephone hardware occurs, there is no immediate motivation to report the loss to cause de-activation of the cellular account. Indeed the unauthorized use may never be discovered, especially where the phone is active on an institutional or business account. For an individual account, the unauthorized usage will probably not be discovered until the next bill arrives, which could be up to a month or more.

Conventional landline telephone equipment has been implemented to block certain numerically defined numbers, such as numbers with the 900 area code, but equipment has not yet been formulated which would tailor a user's service to his particular needs, nor which would make system access decisions based upon his expected modes of use.

Conventional cellular telephones are also limited in their ability to perform a return call-back to the land line originating callers who unsuccessfully made calls to those mobile or portable cellular phones. Absent the caller identification system, there is no current method which will enable a called party to determine the caller identity and on telephone numbers which originated the call, to perform a manually selectable call-back of certain numbers. Even where caller identification is available, any call back will be accompanied by manual dialing activity. What is therefore needed is a system which will enable numbers to be manually selected for automatic entry into a telephone for calling back the parties which wish to call the mobile or portable telephone user.

Another system which is not currently available with conventional cellular telephones is the ability to have the cellular telephone initiate a call remotely. This feature is desired for several reasons. First, a call placed to a mobile or portable station would give an audible ring, which would have to be followed by some physical manipulation of the equipment, such as picking the receiver up, to complete the audible connection. There may be a myriad of reasons why both the calling and the called party might desire there to be no audible ringing upon the initiation of a call. There may be circumstances where a telephone is to be used for surveillance, such as listening in on a child or baby sitter, and it must be turned on and off without noise or delay.

One of the best ways to accomplish this is to alert the mobile phone to dial the call initiator. This is impossible with conventional cellular, because the conventional system can only accommodate a connection between a call initiator and completed by a call receiver's answering the call. The conventional cellular telephone system will not permit a call initiator to initiate a call to himself, from remotely located equipment. Such a feature is also useful where a sub-system owner wishes to monitor equipment.

For example, a caller may leave an emergency telephone next to a radio which is tuned to a sporting event. The user may cause his emergency telephone to initiate a call to listen in on the game. Conventional cellular is limited in that, even with automatic answer, any and all callers would be able to access the line and begin to accrue charges to the cellular telephone.

This feature, which is not available with conventional cellular technology, would be of great use and service in surveillance and remote monitoring. All of the features set forth above are not available in current cellular telephone technology. Further, the infrequent user segment of the market is not being served. With the disadvantages referred to above, there is a further need for an emergency wireless telephone which enables the very disadvantages of the current cellular system.

The needed emergency wireless telephone should be made in sufficient quantity and made sufficiently available that it can be stored for long periods of time with minimal battery dissipation, the ability to more readily predict current battery state and no need for battery replacement outside the batteries' shelf life. The needed phone would be configured and operated according to a system which supports virtually no battery dissipation, or at least a very low usage until needed. Ideally, the emergency wireless phone will be able to monitor the battery useage based upon time and call time, and provide the user with a continuing, and automatic source of replacement batteries. When needed, the emergency wireless phone should immediately switch on and automatically place the user in contact with help or assistance. The needed emergency wireless telephone should not facilitate to usage which is radically different than the usage to which the legitimate user of the telephone normally subjects to the instrument, but will always facilitate an emergency usage. The configuration of the needed emergency wireless telephone should be such that large numbers of infrequent users will enable a new class of service fitted to the needs and demands of the class.

SUMMARY OF THE INVENTION

The emergency wireless telephone and system of the present invention describes a way to improve upon the control and service offered in the conventional public telephone system as pertains to cellular telephone service. The system of the present invention contemplates an emergency wireless telephone which is configured to switch on only when a request to initiate a call is made. Otherwise, this emergency wireless telephone has a zero battery drain from the cellular telephonic circuitry.

The emergency wireless telephone is equipped with at least one singularly large call button which triggers a call to a central receiving station. This operation is accomplished by using an echeloned identification system which enables the central system to directly receive information relating to the identity of the equipment initiating the emergency wireless call, and optionally to send out and receive a verification of the legitimacy of the equipment to avoid attempts to re-program the actual user/owner cellular telephone identity in another type of cellular hardware. The call and emergency buttons may have braille-type bumps or sharp rises to facilitate the use of the wireless emergency telephone of the present invention by the sight impaired.

Further, the emergency wireless telephone of the present invention utilizes a non-standard mobile identification number to further thwart the ability of unauthorized users to access services from the telephone system. The standard North American Dialing Plan format contemplates a number which includes NPP area codes and NXX exchanges which have a specific geographic correspondence. The non-standard mobile identification number is communicated to a central system using a hierarchy consisting of signaling system seven, in-channel ANI spill, and/or a direct link using the cellular manchester modem, and if necessary the use of DTMF, once the call is established. The inventive emergency wireless telephone and system of the present invention provides a method and system of alerting the user of a mobile emergency phone without the need for keeping the cellular telephone's transceiver and microprocessor electronics under power, and which uses a one button power on and dial switch, as well as a system which enables the control and responsibility for a call to be moved further downstream within the cellular telephone system without surrendering the ability to identify the caller's equipment, and optionally, the identity of the caller. The invention further establishes a hierarchy for and insuring that the identification of the calling party is transmitted, both before and after answer supervision is transferred, as well as an fraud protection, interactive identification system using a key and mathematical operator which both verifies the user's identity and eliminates the need for the look-up of the caller's telephone or account number.

The system also includes an interactive in phone electronically controlled switch which can interactively select between the "A" side and "B" side cellular carriers in a given geographic locale, through a variety of methods, including reprogramming by a received electromagnetic signal. The emergency wireless telephone of the present invention has a system which can implement a manual call back method of handling incoming calls, and enables automatic "meet me" handling of incoming calls. By utilizing a nationwide, in-place pager system technology. A significant portion of the telecommunications load will then be eliminated from the emergency wireless phone system. The use of the pager technology involves the integration of a paging receiver with the emergency wireless telephone handset to provide for simple incoming call capability without relying on the complex and incomplete call delivery system of the public cellular network, thus freeing the spectrum burden where the cellular telephone communicates with the cell sites while the cellular telephone is in position to receive a call. This integration has other operational benefits for emergency wireless telephone service as well.

With this technique, the battery consumptive loads can be better managed, and the interactive address of the emergency wireless telephone can have a boundless definition.

BRIEF DESCRIPTION OF THE DRAWINGS

The invention, its configuration, construction, and operation will be best further described in the following detailed description, taken in conjunction with the accompanying drawings in which:

FIG. 4 is a front view of a first embodiment of the emergency wireless telephone of the present invention;

FIG. 5 is a front view of a second embodiment of the emergency wireless telephone of the present invention, and illustrating the integration of pager circuitry, possibly with a separate power source and antenna;

FIG. 5B is a front view of a third embodiment of the emergency wireless telephone of the present invention, and illustrating the optional keypad, as well as the pager circuitry, and which may be used to accept pre-entered calling destinations;

FIG. 5C is a side view of the second embodiment shown in FIG. 5B, emphasizing the modular aspect of the phone, including a modularly mounted pager to take advantage of the serial port which may currently be available;

FIG. 6 is a front view of a fourth embodiment of the emergency wireless telephone of the present invention, and illustrating the optional keypad which may be used to accept pre-entered calling destinations, but without the pager circuitry;

FIG. 7 is a front view of a fourth embodiment of the emergency wireless telephone of the present invention, having both the pager circuitry of the second embodiment of FIG. 5 and the optional keypad circuitry of the third embodiment of FIG. 6;

DETAILED DESCRIPTION OF THE PREFERRED EMBODIMENT

Figure 1:
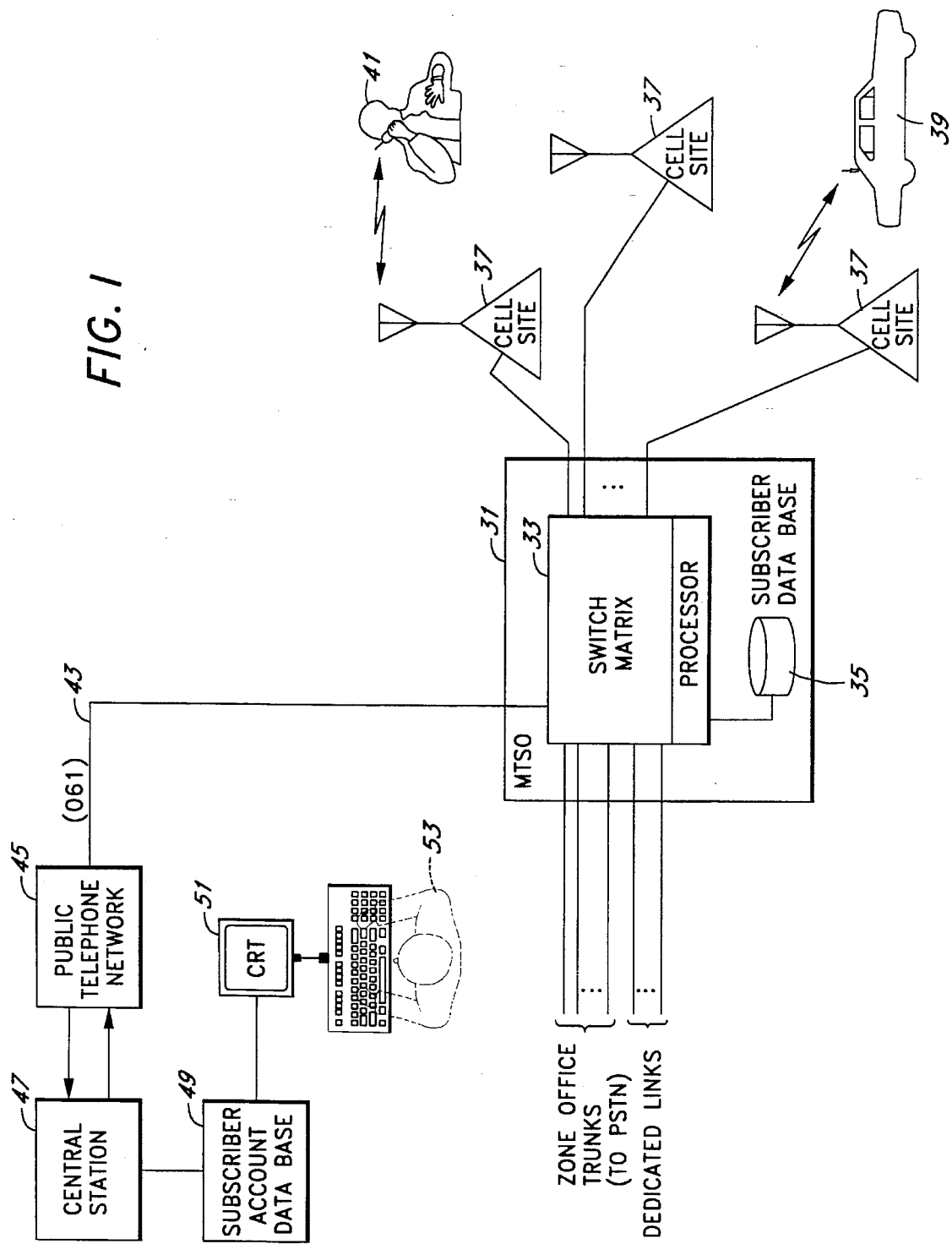
FIG. 1 is a schematic view of a simple cellular network, and illustrating the importance of the switch matrix and subscriber data base to the cellular system.

The cellular system which has resulted from this progression can vary in terms of the minor details, but contains a core of equipment and a core configuration which enables standardized operation. Referring to FIG. 1, a schematic of a simple cellular system illustrates a mobile telephone switching office 31 containing a switch matrix 33. The Switch matrix 33 is connected to a subscriber data base 35 with which the identity of paying subscribers can be identified. The switch matrix 33 is connected to a series of cell sites 37 which may serve a large number of mobile telephone transceivers in its service area, including mobile 39 and portable 41 users.

When an item of equipment is utilized, such as a portable terminal 41 or mobile terminal 39, the user mobile identification number, and electronic serial number is transmitted to the mobile telephone switching office 31, where the switch matrix 33 interrogates the subscriber data base 35 to verify the legitimacy of the equipment. If the equipment travels to a geographic location other than its normal or "home" geographic location, the subscriber data base 35 will not have the verifying information, and will have to place a data inquiry to the subscriber data base 35 of the home service location where the equipment normally resides, in order to obtain a verification of legitimacy. As can be seen, access is denied until the identity of the user is established and verified. This is accomplished through the user's mobile identification number.

Figures 2, 3:
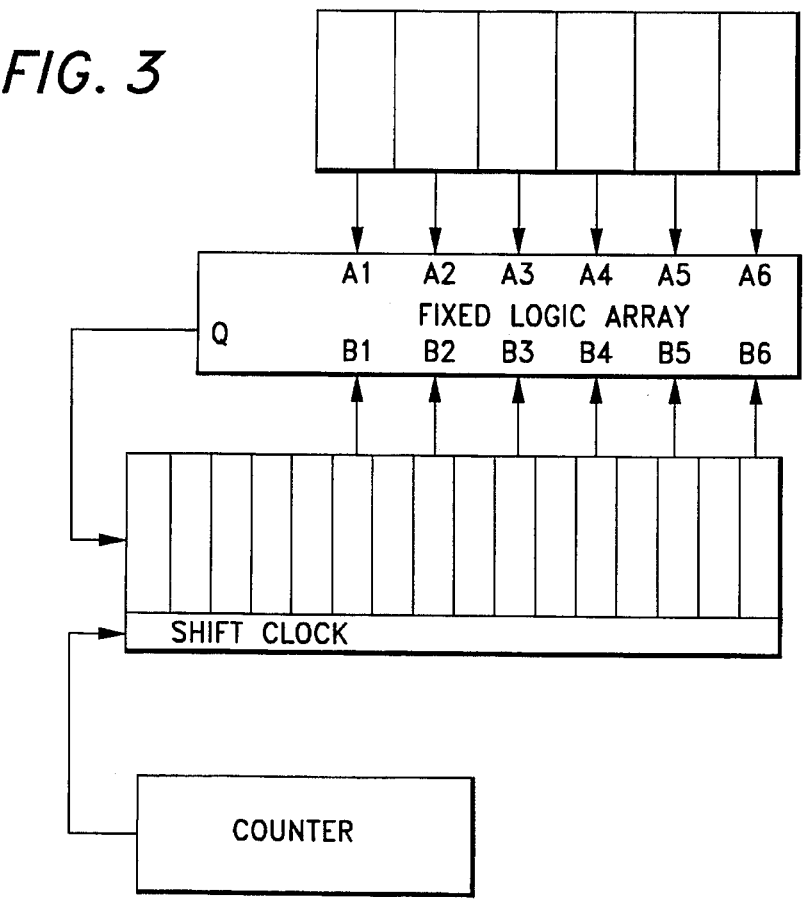
FIG. 2 is a signaling system seven parameter field which illustrates the format in which transmitted and mobile identification numbers are transmitted.
FIG. 3 is a coefficient register which is used to illustrate an anti-fraud provision incorporable into the emergency wireless telephone system of the present invention.

Referring to FIG. 2, a call reference parameter field is shown, which is typically used with regard to the signaling system seven format. Each one of the eight horizontal reference bits are sent as part of an octet, which is shown vertically numbered. To be able to represent all of the ten digits, 0, 1, 2, 3, 4, 5, 6, 7, 8, 9, a minimum of four bits is required. Note that the first two octets identify the nature of the address indicator, numbering plan, and certain other reserved address information, O/E, and spare bits. Beginning with the third octet, the first and second address signals begin.

Again, FIG. 2 is couched in signaling system seven terms, and other types of signaling systems, methods of communication or formats may be utilized. Beginning at octet 3, an identification number may be contained in the message. In the format shown in FIG. 2, each octet carries two numbers of identification. Subsequent octets, which may number in any quantity, carry the remainder of the numerical identification.

The level of numeric information will depend upon the geographic necessity. For example, to accommodate roamers, the information contained in the mobile identification number may probably also contain an area code identifier. Simply containing a seven digit trunk will probably be insufficient. Other information may be contained either before or after the mobile identification number for any of a number of purposes.

Referring to FIG. 1, and according to the present invention, the switch 33 is provided with an instruction to bypass the normal cellular call process and automatically process calls which originate from a mobile identification number which has a particular mobile identification code. In this case, code 061 has been suggested because it can be utilized with the currently used area code format, since it actually represents no official North American Dialing Plan area code. Any caller whose equipment has a mobile identification number having this code programmed in the telephone number assignment module in the appropriate position in its identification sequence will be routed to a line 43 or single destination number. In addition, a number to be called may also be used as a direction to designate the call to line 43 or single destination number. The remainder of the system will be subsequently shown.

However, it is readily apparent from FIG. 1 that by directing any caller having a particular mobile identification number sequence of 061 to a particular line, that several objectives are accomplished. First, the caller does not have automatic and free dialing access to the cellular and public service telephone system, because the call is sent to a particular destination. Secondly, the remainder of the mobile identification number, beyond the 061 code, for example, which has been proposed can be used for subsequent identification. Thirdly, the telephone equipment is typically designed to look for the more significant digits and to ignore further and lesser significant digits.

For example, in a system where the mobile identification number is typically ten digits long, the system will not look beyond ten digits unless there is a specific command sequence which instructs it to do so. Subsequent digits will usually be ignored. In the system shown, and because the digit-limited comparison performed by the cellular telephone switch matrix 33 has been circumvented, and will be expected to be circumvented, the mobile identification number can be significantly longer than the number of digits allocated for mobile identification using the standard North American Dialing Plan numbering.

Once the call is routed past the switch matrix 33, the "call" moves into the public telephone switched network 45. Although shown as a single connection, both the analog signal, and other systems including signaling system seven and ANI spill, and any other systems which are or may be in use, will carry an identification of the mobile or portable cellular telephone, preferably the mobile identification number. Thus the information is carried past the public telephone network 45 and on into a central system 47. Thus, call processing for unconditional routing to operator services is present with the invention. This characteristic is very important for an emergency phone.

Preferably, the central system will contain equipment compatible with signaling system seven, ANI spill or other information routing mechanisms, which operate with the called party, in this case the central system, off hook. The priority of use, as between signaling system seven and ANI spill, is that signaling system seven is the preferred method, and that ANI spill is the second most preferred method for its speed and accuracy.

In most cases, one system or the other will be present, and there may be no opportunity to choose between the two. Speed is an important part of the emergency calling system, and if the mobile identification number or other identifying information can be received at the central station as early as possible, and before the audible, two-way voice portion of the call is completed, the verification of the legitimacy of the caller can occur early, before further time is spent actually dealing with the caller.

Throughout this text, the term gateway, dispatch call center, or central station may be used interchangeably. By central station, is meant a single or multiple location center for handling calls. For preference, the term dispatch call center will be used, but any "focal point" of communication will be an acceptable equivalent.

In the event that signaling system seven, or ANI spill has failed, or is not available, the invention makes use of a third system for transferring information. Conventional portable cellular telephone equipment makes its identity known to the switch matrix 33 by using a built-in manchester modem. It is this modem which sends out the formatted mobile identification number shown in FIG. 2. Although this modem is currently enabled to only send out the mobile identification number and the destination number, it can be further utilized after the audible portion of the call is completed at the dispatch call center 47 to send out the mobile identification number, and other information.

As is also shown in FIG. 1, the dispatch call center 47 is connected to a subscriber account data base 49. The subscriber account data base 49 can not only contain the mobile identification numbers of the subscribers of the emergency telephone service customers, but other associated data. Associated data may include a security key data base upon which the portable terminal 41 will be verified, a list of telephone numbers relating to the client's emergency needs, such as the location and telephone number of a nearby hospital, parent, spouse, etc. Typically, this type of information will be retrieved from the subscriber account data base and shown on a cathode ray tube or other display to a system operator 53. Other information may include non-emergency telephone numbers identified by a generic identifier such as "parents," or "home," or "work".

The emergency wireless telephone system is also intended to serve not just calls related to emergency situations, but to facilitate infrequent and urgent type telephone calls. The subscriber data base may also contain other verifying information which the caller can relate verbally to the system operator 53. This form of personal information could include other more commonly available information, such as social security number, mother's maiden name, etc., but may also include an identification number, or personal identification number, more commonly known as a pin number.

Thus, the invention and system herein provides for transfer of information to the dispatch call center 47 as rapidly as possible by signaling system seven, ANI spill, manchester modem after call supervision has passed to the dispatch call center, and finally verbal verification with a system operator 53. This order of priority will reduce the sysop time on the line identifying the caller.

In furtherance of anti-fraud procedures and protections, the inventive system herein has shown the provision of modification of the phone mobile identification number. Further, and since the portable terminal 41 or the mobile terminal 39 have been shown to be equipped with internal modems, the programming of the emergency wireless telephone from the dispatch call center can be accomplished for any number of purposes. The reprogramming of the mobile identification number can occur, the reprogramming of a key quantity can occur. Even the reprogramming of the directed call number or mobile identification number can occur, where it is desired for the dispatch call center 47 to operate as a distributed chain of linked centers, rather than routing to a central location. Thus, the call to the dispatch call center 47, or a distributed group of centers 47 may be accomplished by identification numbers, including the 061 identifying number, as well as other identifying numbers.

This re-programming capacity is valuable, because as the emergency wireless telephone system matures, it may be desirable from time to time to modify slightly the operation of the emergency wireless telephone. It would be possible to implement such changes through over-the-air instructions sent from the dispatch call center 47 to the portable terminal 41 or mobile terminal 39 using the post-connection automatic data interface facilitated by the use of the manchester modem. There are numerous other potential applications for the post-connection automatic data interface. These can be added as needed by development of interface protocols to support them.

The system herein exhibits fraud protection. The dispatch call center 47 may send a challenge to the emergency wireless telephone in the form of a random number. The phone would then be required to translate this number to a different number based upon a "private key", and send the new number back to the dispatch call center 47, which would also find the same new number by applying the same private key. The dispatch call center 47 could then terminate the call if the response number does not match this internally calculated number. This feature allows the emergency wireless telephone system to protect itself against fraud without relying on the complex and not yet fully deployed nation wide carrier interactive cellular authentication system.

With regard to a key, or authentication key algorithm, this may be programmed into the emergency wireless telephone either as a hard wired option or as an option which may be programmed by the manchester modem as outlined above. A wide variety of such schemes may be formulated, but one such example is as follows.

Assume a key having a 12-bit word, divided into KEY1, consisting of the most significant 6 bits, and KEY2, the least significant 6 bits. The 12 bit key could be used to convert a 16 bit "challenge" random number to a specific response number by an algorithm as follows: The challenge number will be loaded into the shift register shown in FIG. 3, while KEY1 will be loaded into the feedback coefficient register. A number equal to KEY2+the 16-bit challenge number will be loaded into the shift down clock down counter. The contents in the shift register will then be shifted right until the down counter reaches 0. The contents of the shift register at that time will be the response word. The response word will then be sent back to the dispatch call center 47 of FIG. 1.

Next an examination of an emergency wireless telephone which will replace the portable terminal 41 of FIG. 1 will be shown. The emergency wireless telephone 61 of FIG. 4 is equipped with a call button 63 and a help button 65. The telephone 61 is configured to only energize upon pressing one of the two buttons 63 or 65. This is referred to as a "wake and call" operation. Once button 65 is depressed, the phone 61 circuitry is energized, and a dialed address is automatically sent out to the cellular network shown in FIG. 1.

The fact that the "wake and call" feature operates from a quiescent state where no emergency phone battery drain takes place, enables a very specific prediction process for battery replacement. Alkaline batteries are known to deplete, absent useage, at the rate of about 1.2% per month, of their original capacity. Since the phone 61 is only "on" when it is talking to the dispatch center 47, the computers at the dispatch center 47 can have the ability to exclusively track the useage of the phone 61.

With this ability, the dispatch center 47 can coordinate the transmission of a fresh battery pack or supply to the user when the useage causes the battery capacity to fall below a pre-determined level. Since the ordering is done electronically, the fresh batteries can be sent overnight or on a one or two day delivery schedule. Further, the computer at the dispatch center 47 can track the use, and would be able to better predict the useage needs of a particular user. As stated, capacity and its diminution is a combination of time and useage, which can be very precisely predicted by a computer. In this manner, the emergency telephone 61 system will serve the user by helping to prevent depletion of battery reserve.

An important feature of the phone 61 is its lack of an overly complex set of controls. Currently available cellular terminals 41 are equipped with an extensive keypad. Besides the conventional 12-button telephone keypad, there are keys, typically labeled "SEND", "END", and "POWER" needed to accommodate the user to the unique operation of the cellular network. For example, the "POWER" key is needed because, unlike wireline phones, cellular phones, especially battery powered hand portables, need to be turned on and off independent of any call processing function. The "SEND" key is needed (and its operation is often very confusing) because in cellular outgoing calls must be dialed before accessing the network rather than after "coming off-hook" and hearing dial tone. The "END" key is needed for hand portable cellular phones because they typically do not have a "going on-hook" function that can define for the network the user release of a call. Users new to cellular typically require education on the use of this extended keypad and on the use of the cellular system in general.

For infrequent users, or for those whose only need for wireless service is for security in the event of an emergency, or to place infrequent types of urgent or other calls, the relative complexity of a cellular phone compared with the more familiar operation of an ordinary wireline phone can be daunting.

The emergency wireless telephone 61 of the present invention does away with user complexity by providing, in its most basic version, only two buttons 63 and 65, which are shown in FIG. 4 as being labeled "CALL" and "HELP". When the user wishes to place a call, he or she presses one or the other depending upon whether the call is of an emergency "HELP" or general "CALL" nature. The phone 61 (transparent to the user) then powers up, identifies the cellular system in its location that provides emergency wireless telephone service, known as the "A/B Cellular System Selection Hierarchy," and places a call using a predetermined called address which enables Unconditional Routing to the dispatch call center 47.

This "wake and call" operation eliminates the need for the user to have to deal with a "POWER" key or a "SEND" key. The user has the option to conclude his or her call by pressing the same button, or either of the "Help" or "call" buttons to cause the phone (transparent to the user) to release the call using standard cellular protocols and then power down. If the user forgetts to push either button, the telephone will automatically power down when the supervisory audio tone is no longer detected. Thus power and air time will be automatically conserved. The user quickly equates the pressing of the buttons to "coming off-hook" and "going on-hook" on a conventional phone.

The destination of the call, however, will in all cases be the dispatch call center 47, once the button 63 is pushed. In the event that button 65 is depressed, the call will be routed through the switch matrix 33 directly to the local emergency authorities, typically the same organization which is notified when 911 is dialed from a standard phone. This is not inconsistent with cellular practice, since subscriber data base 35 verification is not addressed for a 911 call.

Note that the phone 61 does not immediately have a button array for dialing, although this is an option which will be later discussed. Once the call is routed to the dispatch call center 47, the identity of the phone 61 will be routed through the public phone network to the dispatch call center 47, and verified in the subscriber account data base 49. The routing will be accomplished via the systems earlier discussed, including signaling system seven, ANI spill, or a supervised call facilitated by the manchester modem. In this supervised call mode, the information may be routed to the subscriber account data base 49, and to the cathode ray tube 61 for inspection by the sysop 63, before the audible portion of the call is initiated.

Once the system operator 53 receives the call, the caller may request re-connection to any other dialed station. Further, the user information on the cathode ray tube 51 may include a pop-up menu associated with the identity of the emergency wireless phone 61. Once the caller has been identified, for example, by the mobile telephone 61's identification number, and perhaps by an algorithm key described in FIG. 3, a file associated with the subscriber, or his emergency mobile telephone 61, the subscriber's personal file may be displayed automatically to the system operator 53.

The menu may be in a variety of formats, including designations other than numerical designations. For example, a user's associated file may include the designations "home," "work," "school," or "office." The numbers associated with these designations need not even be shown. The system operator 53 can complete the call by depressing a key associated with one of the above designations.

Other information may appear, such as information relating to the caller's identity. As in the situation where another has access to the callers emergency wireless telephone, a caller may wish to limit calls to a password or personal identification number which may appear on the system operator 53's cathode ray tube 51 and may require personal verification by the caller.

The caller can request connection to a coded call destination such as "home," or to a given number, or the caller can ask the sysop to access the number through directory assistance or a caller's less frequently used directory which may be stored in the subscriber's account data base 49. After directory assistance help is given, the number can be entered in the subscriber's account data base 49 for future use.

Referring again to FIG. 4, the emergency wireless telephone 61 can have several options, including a pager circuit 71, which is shown in FIG. 5. The pager circuit 71 may be a separate entity, or it may be integrated into the housing of the telephone. When used separately, it may be facilitated for the pager to be plugged into and unplugged from the phone 61. As is shown, the pager 71 is integrated into the phone 61, including its display 73. Its antenna may be separate or included with the phone 61 antenna 75.

As discussed earlier, a portion of the "load" which a conventional portable terminal 41 or mobile terminal 39 places on the cellular system is due to the requirements to provide call receive capability. It is the call receive capability which makes the mobile identification number inflexible in that it should correspond to a called number compatible with the North American Dialing Plan. Without the necessity for either call receive status, or the necessity for telephone company supervision of the legitimacy of the caller, the burden and therefore the costs associated with the cellular carrier is much lighter.

With the use of pager 71 circuitry, the telephone 61 user can be contacted. The options associated with the use of the pager 71 circuitry enable wide latitude in the options available to the user of the telephone 61, but without usurpation of the additional load figure associated with the call receive capability outlined above. By using pager circuitry, rather than the overall telephone circuitry, flexibility of design is possible. Pager 71 circuitry can have a power source separate and apart from the battery power source needed to operate the telephone 61.

In the event that the pager battery power source became unavailable through battery drain, corrosion, etc. the user of phone 61 would still be able to place a call in an emergency or urgent situation. In addition, a power indicator 77, or an icon "LOW BAT" displayed on the display 73 can be provided which will light, perhaps accompanied by the sound of a loud aural alarm through the telephone 61 speaker 79 at a point in time significantly before the battery supply to either the pager circuitry 71 or the circuitry of telephone 61 became in danger of having insufficient power for normal calling operations. This alarm could be intermittent, in order to alert the user while conserving energy spent in performing the alarm function. The aural alarm could consist of one tone for pager power and another for power to the phone 61.

Another option, and especially for those users who had a separate pager, and to avoid dual pagers or dual pager frequencies, is a serial connection between the phone 61 and the pager circuitry 71. This connection would enable wait and call service, where the user chooses not to carry the telephone 61 with him. For example, and especially where a pager was made in a manner to facilitate physical integration with the phone 61, the pager could be worn on the belt and used in the conventional manner.

Each time the pager was triggered, the messages would be recorded and displayed in the conventional manner. A request for call back could be left in the pager circuitry 71 buffer, or canceled before the pager is re-connected with the emergency wireless telephone 63. Upon re-connection, the dial back information would then be made available to the phone 61, and the appropriate steps taken.

The pager circuitry 71 could be fitted with a switch 79 which enables the user to choose between selective call back and automatic call back. Thus, a caller could telephone a pager transmitter to alert the user's pager circuitry, and then dial in a command code to initiate the phone 61's call to the dispatch call center 47. The dispatch call center would then complete the call to the original caller in one of two ways. In the first way, the telephone number of the pager caller would be passed on to the manchester modem in the phone 61, and transmitted back to the dispatch call center 47 to enable the dispatch call center to complete the call, automatically. The second method would entail the involvement of the dispatch call center 47 with the identity of the pager caller, and where the phone 61 owner would verbally ask the dispatch call center 47 to call back a particular pager caller.

Where the pager caller otherwise identifies himself within the content of the page, either by number or by name, the return call can be made by the holder of the phone 61 by reading the visual indication provided on display 73, and making a call through the dispatch call center in the usual way.

In another option, a keypad is shown in FIG. 5B with the identifying numeral 81. This is an optional keypad, because the phone 61 can be operated easily without it. Rather than having to speak with the dispatch call center 47, the user of the phone 61, having the optional keypad 81 can punch in a number to be dialed, before activating the button 63. The number entered can be transmitted to the dispatch call center behind the format shown in FIG. 2, or in response to an interrogation from the dispatch call center 47.

This 12-button telephone keypad 81 as well as the two buttons 63 and 65 gives several advantages. In this case, pressing the call button will provide the same operation with respect to the cellular network, but the emergency wireless telephone operator service facility may cause provision of dial tone rather than live operator connection, depending upon the user's pre-specified service preferences or system design requirements. The user will then be able to dial a call conventionally (i.e. after "coming off-hook" and hearing dial tone) rather than dealing with a "SEND" key, or the user may activate the send button 63 and then dial "0" with the keypad to talk with the system operator 53.

In FIG. 5C, the embodiment of FIG. 5B, with both pager and keypad is illustrated in side view. This view illustrates some of the desireable features which may be employed. The pager circuitry 71 can be shown embodied within a separable portion of the phone 61 which also contains the power pack, or batteries. This power pack 78 portion includes an on/off switch 78A and a serial port 78B. Many housings for cellular phones contain a serial data port which is used to transmit programming information and commands to the device. Cellular phone housings are usually designed with the serial port at the bottom side. The emergency wireless telephone 61 takes advantage of this in its battery or power pack 78A design by lengthening the power pack 78A, and providing structure to engage the serial port of a cellular phone where it will most likely be found or where it will most likely be designed when considering housings and platforms for the emergency cellular telephone 61.

In the emergency wireless telephone shown in FIG. 5B, a serial port 79 is located on the housing underside. The serial port connection 78B is designed to connect with the serial port 79 simultaneous with the connection of the power pack 78A onto the emergency wireless cellular phone 61. With one move, the power is connected, and the serial output port of the pager circuitry 71, which is serial port connection 78B, is brought into connection with serial port 79 on the emergency wireless telephone 61. It is through this connection that the pager circuitry communicates with the circuitry of the emergency wireless cellular phone 61.

FIG. 7 illustrates the use of raised dimples 80 to facilitate the use of phone 61 by the sight impaired. Dimples 80 may of course be used on the keys of the keypad 81, although it may be found that these may be navigated without the need for such raised dimples 80, due to the relatively more simple arrangement, similar to that of a land line telephone.

As an option still, one of the unmet goals of cellular is to provide service in a manner as closely approximating the manner and use of an ordinary wired telephone as possible. As a result, one of the methods of user dialing could involve a scheme where the phone 61, upon pressing button 63 and making contact with the dispatch call center 47, emits a dial tone which further invites the user to then manipulate keypad 81. This action would serve the goal of making the telephone 61 as much like an ordinary wired phone as possible. The user could then dial a phone number on the provided conventional telephone keypad 81, with each number dialed being translated and sent via the manchester modem to the dispatch call center 47. The dispatch call center 47 would then provide for call routing based upon the received digits.

The "meet me" function enables a caller to send a code consisting of instructions for the phone 61 to call him back, including the number which is to be called back. This information reaches the phone 61 by its pager circuitry 71. The phone 61 then receives the number to call from the pager circuitry, an instruction to automatically activate the circuitry to which button 63 is connected and initiate a call to the dispatch call center 47. The information relating to the party which originated the "meet me" call is also passed to the manchester modem in the phone 61, and that information is made available to the dispatch call center 47 to enable the dispatch call center 47 to automatically or manually complete the call to the originating caller.

From the standpoint of an originating land line call from the public service telephone network, a pager type call is made, and he or she hangs up. Within a few seconds, the cellular phone 61 receives the direction to initiate a call to the dispatch call center 47, makes such call, and rings as soon as the call is made. The originating party's telephone rings and the originating party is in immediate contact with the phone 61. This scheme may be optionally accompanied by a tone, transmitted though the speaker 79 of the phone 61 to announce the making of the call.

The phone 61 may be left in place for a relatively long period of time, and then summoned for a "meet me" call when it is necessary to activate its service as a listening or data collection device. Where the phone 61 is to be used purely as a listening device, it should include a speaker 79 disconnect switch.

Further, because activation of the call is initiated by remote control, the phone 61 will not give off a tell-tale radio frequency signature during its un-powered, standby periods of operation. In effect, it will stand silent awaiting activation.

Figure 8:
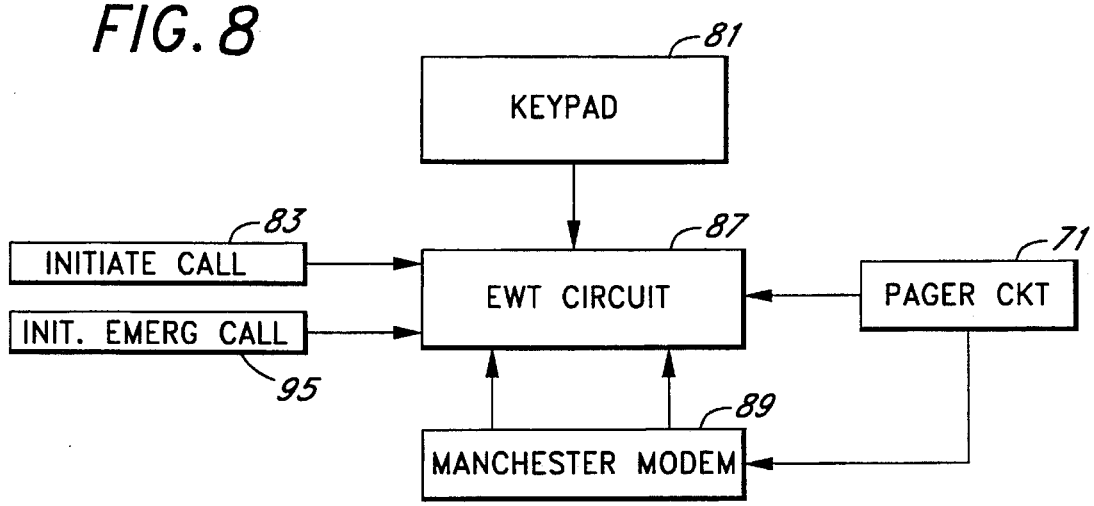
FIG. 8 is a block diagram of some of the circuitry within the emergency wireless telephone of the present invention.

One configuration illustrating the aforementioned capabilities is shown in FIG. 8. The keypad 81, pager circuit 71, and an initiate call block 83 and an initiate emergency call block 85 are connected into an emergency telephone circuit block 87. Emergency telephone circuit block 87 represents the circuitry necessary to place a call using cellular service, and contemplates the majority of the circuitry of phone 61. A manchester modem 89, which exists in commonly available in all portable cellular terminals 41, is shown separately to emphasize the connection possible with the pager circuit 71.

Remembering that the emergency wireless telephone circuit 87 already contains a unique mobile identification number and other electronics, it can be readily seen that the manchester modem 89 can communicate with the telephone circuit 87 not only to facilitate the transmission of modem messages, but to also receive instructions and programming signals from circuit 87 to return to and cause the programming of circuit 87, as well as to receive commands and programming instructions from the pager circuit 71.

The interactive programmability with respect to the pager circuit 71, coupled with the much wider coverage of pager terminal and associated radio transmitters compared to the cellular carrier's individual cell sites, opens new possibilities with regard to the control and optimization of the circuit 87, especially with regard to programming. For example, an interactive, in-phone electronic switch which can interactively select between the "A" side and "B" side carriers in a given locale. The use of the pager circuit 71 to accomplish this goal is most advantageous for several reasons. Remembering that the telephone 61 does not have the ability to receive calls, the dispatch call center 47 would be able to affect the programming of the telephone only upon the occurrence of the telephone 61 placing of a call. This could be problematic where an infrequent user may keep the phone for years, and through several changes of batteries based upon expired useful life of the batteries, the A/B memory could be out of date before a call is made.

Further, and especially with respect to the "A" side and "B" side carriers, the necessity or efficiency of choosing one over the other is usually based upon a fairly wide geographic basis, such as city or several counties wide. Paging systems provide county wide coverage. Thus, the pager circuit 71 can be used to directly instruct the circuit 87 to choose an "A" side or "B" side carrier. Such an instruction would affect all of the telephones 61 in a conventional metropolitan area, but would cause no effect on other types of pagers or portable terminals 41. This is similar to the information currently received on pagers in a passive mode, directed to stock market quotes, weather, etc.

The telephone 61 is capable of accessing both the A-Side cellular carriers (non-wireline) and the B-Side cellular carriers (wireline). The electronic selection process, that determines which one of the two cellular carriers in a Standard Metropolitan Statistical Area (SMSA) that will be accessed to provide the wireless voice cellular service, is managed by an internal portable telephone software controlled program that uses two different A/B smart switching methods. The first method uses the "emergency wireless telephone Page Select" a numeric page and cellular communications combination method, and the back-up method is the "emergency wireless telephone/System I.D. (SID) Table Update", a modem communications and table update method.

As such, the circuit 87 is programmed to switch from the "A" side carrier to the "B" side carrier (or vice-versa) if it cannot make the proper connection to the dispatch call center 47 within a pre-programmed amount of time. In this manner, even if the emergency wireless telephone circuit 87 has been out of use for years, such that it could not have received an instruction to switch from an "A" side carrier to a "B" side carrier, it can at least "find" a working side to make the call, and can then be properly programmed to continue to use that "side" once the call is made.

The present invention pertains to a nationwide, and perhaps worldwide wireless two way voice gateway communications system designed to provide subscribers with the options to initiate emergency type calls, and or urgent occasional type calls to telephones on the public switched network. The subscriber hardware, telephone 61, is a full duplex, self contained battery powered portable wide area device. The portable telephone 61 operates in the Advanced Mobile Phone Service (AMPS) with ANSI standard EIA/TIA 553 supported by the cellular communications networks that are already in use today which is available across the United States and other countries as part of an existing infrastructure that does not need to be created.

Further exploring the logic and advantages of the present invention, the operation of the emergency wireless telephone 61 system from the user's perspective is made possible by routing all calls, with the possible exception of "HELP" or 911 calls, to a common operator services gateway, the dispatch call center 47. This requires that the cellular call involved be routed by either the public switched telephone network or dedicated facilities to the dispatch call center 47. This is accomplished by taking advantage of the call routing translation tables that are common to cellular switching equipment.

When an emergency wireless telephone call is placed, the emergency wireless telephone places a conventional call initiation message on the cellular control channel, but with a unique code inserted in the field otherwise occupied by the "called address" telephone number in the number assignment module. By virtue of the phone's unique emergency wireless telephone mobile identification number, which is transmitted in the same call initiation message, the cellular system recognizes the call as originating from an emergency wireless telephone, with as little information as the "061" pseudo-area code designation previously discussed. It then routes the call to a particular directory number or dedicated trunk based on the code in the called address field. This directory number or dedicated trunk carries the call to the emergency wireless telephone dispatch call center 47.

A plurality of such codes can be defined that are "translated" by the cellular switch into different directory numbers and/or trunk groups. This will allow different types of emergency wireless telephones to be connected to different emergency wireless telephone operator services. By prohibiting calls from an emergency wireless telephone to any other called address, the cellular switch prevents fraudulent use of an emergency wireless telephone 61 by use of the data fields associated with its mobile identification number, which do not have to be formatted according to standard number protocol, and can be of any length. The ability to use a lengthy number will enable the "encryption" of very particularized user information, including the types of services available and implimentation of different priority call handling methods.

For example, the numbering scheme may indicate to the gateway to (a) look for a call from the keypad 81 first, or to (b) use operator answer (especially where the number identifies the phone 61 as having no keypad 81), or (c) to provide "standard phone" equivalent service by initiating a dial tone prior to actuation of the keypad 81, or (d) instruct the system operator 53 or the subscriber account data base 49 to limit the calls to other station by area code, or mobile/land line designations, or perhaps to one of a short list of numbers, such as "office" or "home," etc., to prevent unauthorized use. Other limitations might include an instruction to limit the length of a call, absent operator intervention and verification of personal identity.

Thus the availability of (1) a system which does not use the standard mobile identification number also enables a system which (2) can facilitate an extremely customized instruction string to truly personalize telephone 61, and thus give the user the best and most secure service available. Re-programming of the codes will not require complex button pushing schemes, but can be accomplished, usually at no cost to the user by a simple connection with the system operator 53 to verbally instruct that the account configuration be changed. The changes will be made by the system operator 53, by modem to the phone 61 while the user states his preferences verbally to the system operator 53.

In order to efficiently provide billing accounting and personalized services to the user, the emergency wireless telephone dispatch call center 47 can be automatically provided with the identity of a calling emergency wireless telephone phone by means that are transparent to the user. Unfortunately, the capability of cellular switches to provide automatic number identification (ANI) varies from system to system, as previously described. Therefore, the emergency wireless telephone system relies on a hierarchy of user identification means, as follows.

By using the emergency wireless telephone 61 call processing described above, with routing translation provided by the cellular switch matrix 33, emergency wireless telephone calls can be routed to terminations within the emergency wireless telephone dispatch call center 47 that are equipped to handle the particular means of user identification available for that call. This routing will, of course, be transparent to the user.

A unique feature of the connection between the emergency wireless telephone 61 and the emergency wireless telephone dispatch call center 47 is the use of an automatically provided data interface so that many administrative and other functions can be accomplished quickly and efficiently after the connection is made but before the user and a live operator speak to each other. This allows for the most efficient use of operator time and cellular airtime, and provides a better class of service to the user, that would not be possible if the information transfer had to be done by voice instead.

The automatic data interface works according to any programming scheme, and can be tailored to the user's own preferences and tastes. One manner of operation might be as follows: The emergency wireless telephone 61 may not immediately provide a transmit and receive audio connection to the user after initiating a call. Instead, it may be programmed connect a data modem to the audio interface. When the emergency wireless telephone dispatch call center 47 accepts an incoming call (on trunks dedicated to calls from data-capable emergency wireless telephones) by providing network standard answer supervision, it may first connect the call to a modem. The modem in the emergency wireless telephone dispatch call center 47 then initiates a data connection with the modem in the emergency wireless telephone 61. Information transfer is then carried out by pre-established protocols, and should require at most just a few seconds. After information transfer is completed, the two modems, including a modem at the dispatch call center and the telephone 61 modem 89, drop off the connection. The audio path is then established to the user of the telephone 61. In the dispatch call center 47, the call is then routed as required, typically to system operator 53, or some other live operator under the control of a system operator 53. With modern automatic call distributed systems, a single system operator 53 may control a variety of operators, or the system may have a variety of sysops 53 of equal rank. This routing may, in fact, be based in part on the information just provided by the phone 61 in the data connection, and according to the user's preferences. Some of the information obtained from the phone (e.g. user's identity, city where was originated, etc.) may also be routed to a cathode ray tube 51 or other computer screen at the system operator 53's position so as to enhance the services he or she can provide to the emergency wireless telephone user on the other end of the call.

Some applications of the post-connection automatic data interface are many, an a few may include the following: positive indication of connection of the emergency wireless telephone 61 to the dispatch call center 47; a data "handshake" with the modem in the dispatch call center 47 to confirm to the phone that a connection has been successfully made without requiring user interpretation; and, user identification by providing the telephone 61's emergency wireless telephone mobile identification number if requested by the dispatch call center 47.

With regard to the "A"/"B" cellular system selection hierarchy, when an emergency wireless telephone 61 "wakes up" to place a call for the first time in a new location, it will probably not have awareness of its location, and will therefore not know which if either of the local cellular carriers, "A" or "B", support the emergency wireless telephone system. To provide expected service, however, the phone 61 must quickly establish connection to the emergency wireless telephone dispatch call center 47. To meet this requirement, the phone will have a hierarchy of processes that should result in selection of the correct system or determination that neither carrier in its particular location can provide service. In order of preference, a potential hierarchy of these processes is as follows.

Ideally, cellular control channels in systems that support emergency wireless telephone service would periodically transmit a unique message that indicates the desired carrier "side", namely "A" or "B" which should be used. This action may require considerable development on the part of cellular infrastructure manufacturers and may therefore be not likely to occur in the foreseeable future.

The next process includes the use of nationwide broadcast paging messages received by an integrated paging receiver within the phone 61 such as those shown in FIGS. 7 and 5. The paging system can be used to transmit messages and commands, including those that specify system identification numbers and pre-specified called addresses pertaining to the local cellular systems deisgned to provide service for the emergency wireless telephone 61. This method enables the phone 61 to "roam" to another cellular service area, and receive the information necessary to use a local pager system.

The next process could be the use of a carrier service provider list, kept by the phone 61, of specific cellular system identification numbers for systems that have been designated to provide service in a specific area or that are downloaded from the dispatch call center 47 using the post-connection automatic data interface.

The final process is by trial and error. The phone 61 first attempts a call on one system, expecting that the data "handshake" with the emergency wireless telephone dispatch call center 47 will occur within a particular time. If the handshake is not made within this time, the phone 61 will automatically electronically switch the A/B logic to attempt to call on the competitive service. The Phone 61's system identification number list will be updated by successes and failures using the trial and error process.

The A/B system selection hierarchy will work as follows, assuming that there is no unique control channel marker. If the phone 61 has an integrated paging receiver circuit 71 which has received the current A/B system identification number designation message, the phone will note the designated "A" or "B" system identification for that city upon powering up to make a call. Included in each system identification number is a code that indicated whether the system it identifies is "A" or "B". The phone 61 will then know where to look, namely the "A" system or the "B" system or both, for service. If the strongest control channel on either "A" or "B" systems transmits a system identification number from among those designated, the phone 61 will initiate the call on that system.

If the phone 61 cannot complete a call using system identification numbers designated in broadcast paging messages, or if no such messages have been recently received within a reasonable amount of time, perhaps within the last 2 minutes, or if the phone does not have an integrated paging receiver circuit 71, then it will determine if either the local "A" or "B" system identification number is found in its system identification (SID) number table, perhaps stored in the microprocessor along with its mobile identification number and other program information. If so, it will initiate the call on the appropriate system.

If neither local system identification number is found in its system identification number table, or if it could not make connection on a system with a system identification number from its table, then the phone 61 will revert to trial and error as described above. If the phone 61 still cannot obtain connection to the emergency wireless telephone 61 dispatch call center 47, then it will provide a failure tone to the user and turn itself off.

Figure 9:
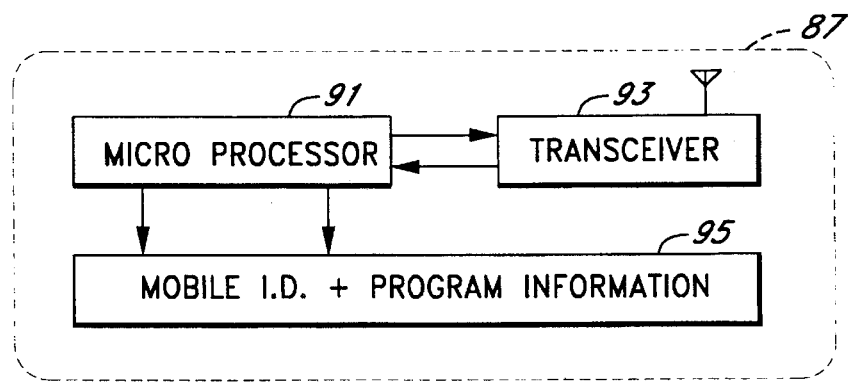
FIG. 9 is one possible block diagram of the emergency wireless telephone circuit shown in FIG. 8.

One such configuration of the emergency wireless telephone 61 circuit 87 is shown in FIG. 9. There could be a myriad of configurations which are possible to carry out the system and method of the present invention, FIG. 9 illustrating a general configuration. A microprocessor 91 is connected to a transceiver 93, and can both receive information and pass control instructions and information from and to the transceiver 93. The micro processor 91 has access to a mobile I.D. and program information chip 95 which is programmable to hold the mobile identification number, pre-determined called address, secondary called addresses (such as those entered from the keypad 81) and other routines and information.

The mobile I.D. and program information chip 95 is programmable, either directly, or though a connector port on the phone 61 (not shown), or through communication through the manchester or other modem 89. The interaction with the blocks shown in FIG. 8 could be many and complex, particularly with regard to a preferred interrupt scheme.

By integrating standard paging receiver circuitry 71 into the emergency wireless telephone 61, some important features can be realized. One of these, receipt of system identification numbers for nearby systems that support emergency wireless telephone, will be discussed. In addition, this integration would allow for either manual or automated handling of incoming calls from the central system 47, or any other caller to the emergency wireless telephone 61, which would otherwise only be used to make outgoing calls.

Figure 10:
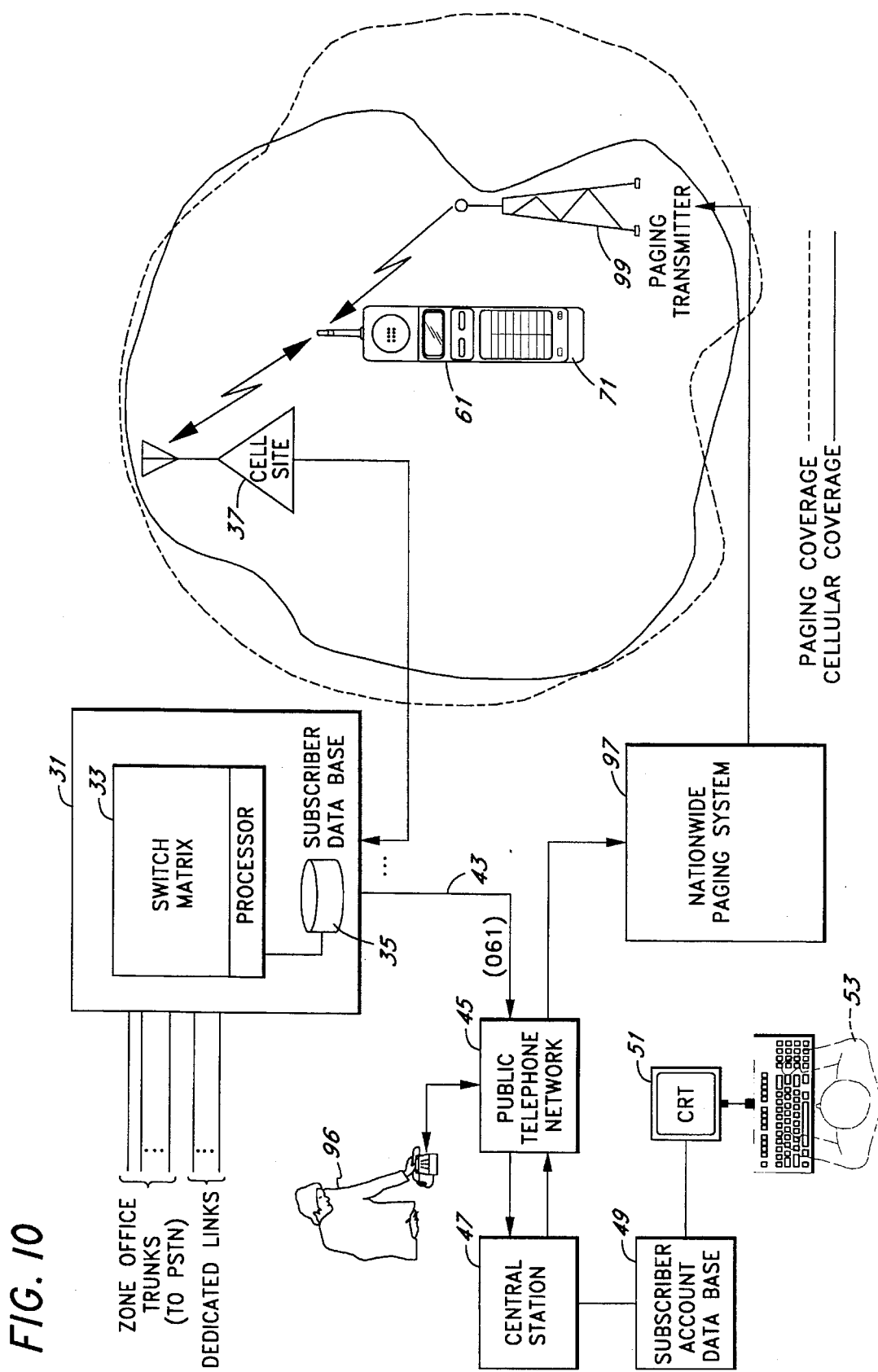
FIG. 10 is a description of a system in which the emergency cellular telephone of the present invention may be utilized and illustrating the use of the pager system in concert with the cellular system.

One possible configuration of the system is shown in FIG. 10. This overall schematic diagram is somewhat reflective of FIG. 1, but illustrates the integration of the phone 61 and its pager circuitry 71. For automatic ("meet me") connection of incoming calls, and where the central station 47, or dispatch call center is equipped to also handle the pager calls. An outside caller from any phone wishing to reach the emergency wireless telephone 61 would place a call to the pager number associated with the pager circuitry 71. The pager circuitry 71 telephone number can be any pager system, or it may be associated with the dispatch call center 47.

Where the pager call address is received at the dispatch call center 47, a common, cap code type paging scheme could be used among a number of phones 61 by employing differing control modifiers keyed in by the user after call supervision was passed. For example, an extension number associated with the particular pager circuit 71 may be required before the particular pager circuit 71 is selected. This system would be similar to the present method for making a long distance call using a calling card, where the toll free number is first dialed in order to get a dial tone, then the destination number is dialed, followed by the account number. In each case, a different tone is used to prompt the caller to enter information relating to the next category.

Assuming that the call dispatch center or central station 47 is in this example, in control of the pager system, A public caller 96 will telephone through the public network 45 to the central station 47, and either verbally request connection with a particular phone 61 having a particular pager circuitry 71 associated with it, or will punch a return call number. Assuming that the request is verbal for the remainder of this example, the dispatch center or central station 47 will, possibly again through the public telephone network 45 initiate a page message to the paging receiver integrated in the desired emergency wireless telephone. This is shown as the Nationwide Paging System block 97 shown in FIG. 10. An electromagnetic signal goes out over a paging transmitter 99 to the pager circuitry 71 in the phone 61. When the pager circuitry 71 receives this page, it will cause the emergency wireless telephone 61 to "wake up" and place a call to the dispatch call center, or central station 47, illustrated in FIG. 10 as occurring through cell site 37.

The cellular call will proceed through the switch matrix 33, bypassing the subscriber data base 35, and into the public telephone network 45, using a special dialed address code that the cellular switch will translate to the directory number of a special "meet me" trunk group at the dispatch call center 47. The dispatch call center 47 will send a message to the emergency wireless telephone 61, which is already now in communication with the dispatch call center 47, to generate a ring indication to the user and will then "patch through" the caller and emergency wireless telephone connections. When the user presses the "CALL" button to answer the phone, he or she will be talking to the caller.

Where the caller 96 punches in a number which is requested for the phone 61 to call, it does not matter whether or not the paging system is associated with the call dispatch center. In this event, the paging transmitter sends a signal indicaive of the number of the call to be returned, which the phone 61 uses to place its return call. In this case, the caller 96 hangs up, and awaits a completely new connection from the phone 61. Whether or not the phone 61 is fitted with a keypad, the modem 89 will have the opportunity to both receive the telephone number of the caller 96, as well as to re-transmit it to the cell site 37 and request immediate connection to the caller 96. In this event, there need be no intervention by the operator 53. The caller 96's phone rings, and caller 96 is in communication with the phone 61.

In this case where the pager control is at a local paging network, and not at the dispatch call center or central station 47, a caller wishing to place a call to the telephone 61 may simply be able to dial the telephone number associated with the pager circuitry 71, (followed by the number, beginning with the area code of the caller in areas having multiple area codes). The number received by the pager circuit 71 is now at the emergency wireless phone 61, and the emergency wireless phone can act on this information. Other special codes and access numbers may be employed to differentiate the calls from the caller 96. For examples, calls from caller 96 without special codes may be held in the memory of the pager circuitry 71 of the phone 61 for selective call back by the user of phone 61. Conversely, a caller 96 with a special code could gain access to an immediate connection with the phone 61, independent of the actions of the user of phone 61.

Phone 61 may be programmed to call the dispatch call center using the number entered into the pager circuit as a secondary called address which is routed through the dispatch call center 47 and directly back to the caller which has hung up his receiver and momentarily awaiting the telephone 61 to call him back. Alternatively, the phone 61 could be programmed to beep, and to only call the original caller back upon the pressing of the call button 63, or some other optional button on the phone 61. In this case, the received pager numbers would go into a stack, and the phone 61 could be programmed to use a first in first out or last in first out arrangement to the stack. The user of the phone 61 could then initiate return calls at his leisure.

An alternative manual "call back" handling of incoming calls where the pager gateway is located at the dispatch call center 47, or where nationwide pager access is had from the dispatch call center 47, and may be as follows. An outside caller wishing to reach the emergency wireless telephone would place a call to the user's pager number, which will be routed to a special trunk at the emergency wireless telephone 61 dispatch call center 47. The dispatch call center 47 will in turn send a page to the paging circuitry 71 of the phone 61 in the desired emergency wireless telephone. When the pager receives this page, it will cause the emergency wireless telephone to generate a "beep" tone to the user, indicating a request to make a connection from a calling party. Meanwhile, the caller will have entered his or her phone number from the calling telephone keypad, much the same as one would when calling a display pager, and then hung up with the expectation of an incipient call back. The emergency wireless telephone user then has the option of initiating a call using a special button on the phone labeled "CALL BACK", which is labeled as 97 in FIG. 7. This will cause the emergency wireless telephone to "wake up" and place a call to the dispatch call center 47 using a special dialed address code that the cellular switch will translate to the directory number of a special "call back" trunk group at the dispatch call center 47. The dispatch call center 47 will then route the call to the phone number that the original caller left.

A variation of both of the above techniques would be to provide the emergency wireless telephone 61 with a display 73 so that the caller's phone number could be seen by the user before deciding whether to allow automatic "meet me" or to make a "call back" call. Where the phone 61 is so programmed, the callback feature can be eliminated, and the telephone 61 display 73 serving only as a list of callers.

While the present invention has been described in terms of an emergency wireless telephone system, one skilled in the art will realize that the structure and techniques of the present invention can be applied to many appliances. The present invention may be applied in any situation where system components are sought to be rapidly and easily replaced with due consideration to insuring that proper polarity is maintained.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An emergency wireless telephone system comprising:
   an emergency wireless telephone;
   single switch means, connected to said emergency wireless telephone, for powering up and initiating a cellular call to a pre-specified called address upon the closure of a single switch;

a dispatch call center for said emergency wireless telephone, having said pre-specified called address for receiving telephone calls;

a cellular switch matrix, capable of receiving calls from said emergency wireless telephone and directing a call to said dispatch call center, and programmed to bypass a call's subscriber data base verification identification upon the receipt of a call directed to said pre-specified called address.

2. The emergency wireless telephone system recited in claim 1 wherein said emergency wireless telephone is programmed with a non-standard mobile identification number.

3. The emergency wireless telephone system recited in claim 2 wherein said non-standard mobile identification number identifies a level of service particular to said emergency wireless telephone.

4. The emergency wireless telephone system recited in claim 1 wherein said dispatch call center further comprises a subscriber account data base containing the particular service needs and service preferences associated with said emergency wireless telephone.

5. The emergency wireless telephone system of claim 4 wherein said dispatch call center further comprises:

an interactive computer terminal connected to said subscriber account data base; and means for routing calls received from said emergency wireless telephone to locations remote from said dispatch call center.

6. The emergency wireless telephone system of claim 4 wherein said dispatch call center further comprises:

a pager circuit in communication with said emergency wireless telephone for receiving numeric information; and wherein said emergency wireless telephone comprises a transceiver electrically connected to a microprocessor and wherein said microprocessor is configured to use said at least numeric information to control said transceiver.

7. The emergency wireless telephone system of claim 6 wherein said microprocessor is configured to control said transceiver including directing said transceiver to call to said pre-specified called address.

8. The emergency wireless telephone system of claim 6 wherein said microprocessor is configured to control said transceiver including supplying said transceiver with a secondary called address and directing said transceiver to call to said pre-specified called address and transmit said secondary called address to said dispatch call center.

9. The emergency wireless telephone system of claim 1 wherein said emergency wireless telephone further comprises a keypad capable of entering a secondary dialed address in addition to said pre-specified called address.

10. The emergency wireless telephone system of claim 2 wherein said emergency wireless telephone communicates its said non-standard mobile identification number to said dispatch call center.

11. The emergency wireless telephone system of claim 10 wherein said emergency wireless telephone system is configured to achieve the communication of said emergency wireless telephone with said dispatch call center by one of either signaling system seven or ANI spill.

12. The emergency wireless telephone system of claim 10 wherein said emergency wireless telephone system is configured to achieve the communication of said emergency wireless telephone with said dispatch call center by modem, after answer supervision is transferred to said dispatch call center.

13. The emergency wireless telephone system of claim 10 wherein said emergency wireless telephone system is configured to achieve the communication of said emergency wireless telephone with said dispatch call center by modem, after answer supervision is transferred to said dispatch call center.

14. The emergency wireless telephone system of claim 1 wherein said emergency wireless telephone contains an electronic fraud protection key which mathematically operates upon numeric information received from said dispatch call center and returns a computed number to the dispatch call center for verification.

15. The emergency wireless telephone system of claim 1 wherein said single switch means for powering up and initiating a cellular call to said pre-specified called address upon the closure of a single switch is also for switching between an "A" side carrier and a "B" side carrier upon the passage of a pre-specified time before a call to said pre-specified called address is achieved.

16. The emergency wireless telephone system of claim 1 wherein said single switch means for powering up and initiating a cellular call to said pre-specified called address upon the closure of a single switch is also for powering down and terminating said cellular call.

17. The emergency wireless telephone system of claim 1 and further comprising a single emergency switch means for powering up and initiating a cellular call to a local emergency dispatch location.

18. The emergency wireless telephone system of claim 17 wherein said single emergency switch means for powering up and initiating a cellular call to a local emergency dispatch location and said single switch means for powering up and initiating a cellular call to said pre-specified called address upon the closure of a single switch are also for powering down and terminating said cellular calls.

19. An emergency wireless telephone system comprising:

a plurality of emergency wireless telephones programmed to initiate a cellular call to at least one pre-specified called address;

a dispatch call center for said emergency wireless telephones, having said at least one pre-specified called address for receiving telephone calls;

a cellular switch matrix, capable of receiving calls from said emergency wireless telephones and directing calls of said pre-specified addresses directly to said dispatch call center bypassing a subscriber data base verification identification associated with said cellular switch matrix.

20. The emergency wireless telephone system recited in claim 19 wherein said dispatch call center further comprises a subscriber account data base containing the particular service needs and service preferences associated with said emergency wireless telephones.

21. The emergency wireless telephone system of claim 19 wherein said dispatch call center further comprises:

an interactive computer terminal connected to said subscriber account data base; and means for routing calls received from said emergency wireless telephones to locations remote from said dispatch call center.

22. The emergency wireless telephone system of claim 20 wherein said dispatch call center further comprises:

a pager system associated with said central system;

a pager circuit associated with each of said emergency wireless telephones, each said pager circuit in communication with its said emergency wireless telephone for receiving at least numeric information; and wherein each said emergency wireless telephone comprises at least a transceiver electrically connected to a microprocessor and wherein each said microprocessor is configured to use said at least numeric information to control said transceiver.

23. The process of operating an emergency wireless telephone system comprising the steps of:

initiating a cellular call, from an emergency wireless telephone to a pre-specified called address which will bypass a call's subscriber data base verification identification which works in conjunction with a cellular switch matrix, receiving said initiated cellular call directly at a dispatch call center for said emergency wireless telephone;

re-directing said received initiated cellular call to a variable called address indicated by the initiator of said cellular call.

24. The process of operating an emergency wireless telephone system as recited in claim 23 wherein said variable called address is indicated by the initiator of said cellular call verbally.

25. The process of operating an emergency wireless telephone system as recited in claim 23 wherein said variable called address is indicated by the initiator of said cellular call via modem.

26. The process of operating an emergency wireless telephone system as recited in claim 23 and further comprising the steps of:

verbally receiving a generic identifier; and associating a pre-stored number with said generic identifier before re-directing said call to said variable called address.

27. The process of operating an emergency wireless telephone system as recited in claim 26 wherein said re-directing said call to said variable called address is performed automatically.

28. The process of operating an emergency wireless telephone system as recited in claim 25 and further comprising the step of entering said variable called address into a keypad.

29. The process of operating an emergency wireless telephone system as recited in claim 23 and further comprising the step of placing a pager call to a pager circuit, connected to said emergency wireless telephone; and wherein said emergency wireless telephone, and wherein said step of initiating a cellular call is initiated in response to said placed pager call.

30. The process of operating an emergency wireless telephone system as recited in claim 29 and further comprising the steps of:

entering a number to be dialed during the placing of said pager call to a pager circuit to be received by said pager circuit; and transmitting, from said emergency wireless telephone, said number to be dialed to said dispatch call center after said step of initiating a cellular call is begun, in response to said placed pager call.

31. The process of operating an emergency wireless telephone system as recited in claim 30 wherein said number to be dialed is the variable called address to which said initiated cellular call is re-directed.

32. The process of operating an emergency wireless telephone system as recited in claim 23 and further comprising the step of supplying power to said emergency wireless telephone and wherein said supplying power step and said initiating a cellular call step are performed by closing a single switch.

33. The process of operating an emergency wireless telephone system as recited in claim 23 and further comprising the step of supplying a non-standard mobile identification number to said central system after the initiating a cellular call step is performed.

34. The process of operating an emergency wireless telephone system as recited in claim 33 wherein the step of supplying a non-standard mobile identification number to said central system is performed according to signaling system seven.

35. The process of operating an emergency wireless telephone system as recited in claim 33 wherein the step of supplying a non-standard mobile identification number to said central system is performed according to ANI spill.

36. The process of operating an emergency wireless telephone system as recited in claim 33 wherein the step of supplying a non-standard mobile identification number to said central system is performed by modem after answer supervision is transferred to said dispatch call center.

37. The process of operating an emergency wireless telephone system as recited in claim 33 wherein the step of supplying a non-standard mobile identification number to said central system is performed by modem after an attempt at supplying said non-standard mobile identification number unsuccessfully by one of signaling system seven or ANI spill.

38. The process of operating an emergency wireless telephone system as recited in claim 23 and further comprising the steps of:

sending a coded number from said dispatch call center to said wireless telephone;

computing a new number using a code key in said emergency wireless telephone, based upon said coded number from said dispatch call center;

sending said computed new number from said emergency wireless telephone to said dispatch call center; and comparing an expected computed new number with said computed new number to verify the identity of said emergency wireless telephone.

39. The process of operating an emergency wireless telephone system as recited in claim 23 and further comprising the step of selecting one of an "A" side carrier and "B" side carrier on which to initiate said cellular call.

40. The process of operating an emergency wireless telephone system as recited in claim 38 wherein said selecting step is performed by receiving information as to the availability of a carrier from a cellular control channel.

41. The process of operating an emergency wireless telephone system as recited in claim 38 wherein said selecting step is performed by receiving information as to the availability of a carrier from a pager circuit.

42. The process of operating an emergency wireless telephone system as recited in claim 38 wherein said selecting step is performed by accessing information within the memory of said emergency wireless telephone which relate system identification numbers with their associated carrier.

43. The process of operating an emergency wireless telephone system as recited in claim 38 wherein said selecting step is performed by trial and error.

* * * * *